(12) United States Patent
Wu et al.

(10) Patent No.: US 11,702,362 B2
(45) Date of Patent: Jul. 18, 2023

(54) MILDEWPROOF AND ANTIROT HIGH-STRENGTH CEMENT PARTICLE BOARD AND PREPARATION METHOD THEREOF

(71) Applicant: Central South University of Forestry and Technology, Hunan (CN)

(72) Inventors: Yiqiang Wu, Hunan (CN); Xingong Li, Hunan (CN); Xia Zheng, Hunan (CN); Yan Qing, Hunan (CN); Xianjun Li, Hunan (CN); Yingfeng Zuo, Hunan (CN); Ming Liu, Hunan (CN)

(73) Assignee: CENTRAL SOUTH UNIVERSITY OF FORESTRY AND TECHNOLOGY, Hunan (CN)

( * ) Notice: Subject to any disclaimer, the term of this patent is extended or adjusted under 35 U.S.C. 154(b) by 975 days.

(21) Appl. No.: 16/571,578

(22) Filed: Sep. 16, 2019

(65) Prior Publication Data
US 2021/0017078 A1 Jan. 21, 2021

(30) Foreign Application Priority Data
Jul. 18, 2019 (CN) .......................... 201910650409.0

(51) Int. Cl.
| | |
|---|---|
| C04B 18/26 | (2006.01) |
| C04B 18/24 | (2006.01) |
| C04B 22/12 | (2006.01) |
| C04B 28/04 | (2006.01) |
| C04B 40/00 | (2006.01) |
| C04B 41/00 | (2006.01) |
| C04B 41/53 | (2006.01) |
| C04B 41/72 | (2006.01) |
| C04B 103/10 | (2006.01) |
| C04B 111/00 | (2006.01) |

(52) U.S. Cl.
CPC .......... *C04B 18/265* (2013.01); *C04B 18/248* (2013.01); *C04B 22/124* (2013.01); *C04B 28/04* (2013.01); *C04B 40/0039* (2013.01); *C04B 40/0071* (2013.01); *C04B 40/0082* (2013.01); *C04B 41/009* (2013.01); *C04B 41/5346* (2013.01); *C04B 41/72* (2013.01); C04B 2103/10 (2013.01); C04B 2111/00612 (2013.01)

(58) Field of Classification Search
None
See application file for complete search history.

(56) References Cited

U.S. PATENT DOCUMENTS

| | | | | |
|---|---|---|---|---|
| 1,596,482 | A * | 8/1926 | Meiggs .................... | C04B 28/02 D25/138 |
| 3,473,514 | A * | 10/1969 | Sundquist ............... | B28B 3/024 427/440 |
| 7,998,571 | B2 * | 8/2011 | Lyons ..................... | B32B 13/12 428/312.4 |
| 2009/0162540 | A1 * | 6/2009 | Golovkova ........... | C04B 41/009 524/4 |
| 2009/0301009 | A1 * | 12/2009 | Falk ........................ | C04B 28/02 52/250 |
| 2014/0349028 | A1 * | 11/2014 | De Silva .................. | C09D 4/00 522/174 |
| 2021/0323879 | A1 * | 10/2021 | Luo ........................ | C04B 28/065 |
| 2021/0395557 | A1 * | 12/2021 | Ma ........................... | C09D 7/20 |

FOREIGN PATENT DOCUMENTS

| | | |
|---|---|---|
| CN | 102101309 A | 6/2011 |
| CN | 106738144 A | 5/2017 |
| CN | 109227867 A | 1/2019 |

OTHER PUBLICATIONS

Ma Xingxia et al., GB/T 18261-2013 Testing Method for Anti-Mould Chemicals in Controlling Mould and Blue Stain Fungi on Wood, Chinese Academy of Forestry Research Institute of Tropical Timber Industry, National Standardization Technical Committee Wood, National Standards Bulletin No. 22 of Nov. 12, 2013, General Administration of Quality Supervision, Inspection and Quarantine of the People's Republic of China, Standardization Administration of the People's Republic of China.

Ma Xingxia et al., GB/T 13942.1-2009 Durability of wood. Part 1: Method for Laboratory Test of Natural Decay Resistance, Institute of Chinese Academy of Forestry Timber Industry, National Standardization Technical Committee Wood, National Standard Approval Announcement Feb. 23, 2009 No. 3 (Total No. 143), State Forestry Administration, Administration of Quality Supervision, Inspection and Quarantine of People's Republic of China; Standardization Administration of China.

* cited by examiner

*Primary Examiner* — John J Figueroa

(74) *Attorney, Agent, or Firm* — Tutunjian & Bitetto, P.C.

(57) ABSTRACT

Technical fields of building external wall decoration and material manufacturing, providing a mildewproof and antirot high-strength cement particle board and a preparation method thereof. The preparation method includes: (1) sequentially carbonizing and water-washing a shaving, and mixing the obtained carbonized shaving with a cement gelling agent, a curing agent aqueous solution and water to obtain a mixture; (2) molding the mixture to obtain a pre-molded material; and (3) sequentially curing and drying the pre-molded material to obtain the mildewproof and antirot high-strength cement particle board. Compared to ordinary cement particle board, which is not subjected to carbonization treatment and water-washing, the cement particle board of the present invention can effectively avoid mildew and rot, and can significantly improve the mechanical strength and durability thereof, helping to extend the service life of the cement particle board.

11 Claims, No Drawings

MILDEWPROOF AND ANTIROT HIGH-STRENGTH CEMENT PARTICLE BOARD AND PREPARATION METHOD THEREOF

RELATED APPLICATION

This application claims benefit of priority of China Patent Application No. 201910650409.0, filed Jul. 18, 2019, entitled: MILDEWPROOF AND ANTIROT HIGH-STRENGTH CEMENT PARTICLE BOARD AND PREPARATION METHOD THEREOF. The above-identified, related application is incorporated herein by reference in its entirety.

FIELD OF USE

The present invention relates to the technical fields of building external wall decoration and material manufacturing, in particular, to a mildewproof and antirot high-strength cement particle board and a preparation method thereof.

BACKGROUND OF THE INVENTION

Cement particle board is an inorganic artificial board prepared by such processes as stirring, laying, pressing, curing and trimming, using Portland cement as a gelling agent, and a wood or non-wood shaving (particle) as a reinforcing material. It has excellent properties such as good mechanical strength, waterproofness, heat insulation, fireproofness, and no release of free formaldehyde or other toxic gases, and can be widely used in such fields as wall material, indoor and outdoor decoration, and indoor and outdoor furniture manufacturing.

The wood or non-wood shaving (particle) in the cement particle board contains hemicellulose and a small molecular saccharide compound. The hemicellulose will be hydrolyzed into carbohydrates such as a small molecular saccharide under certain water and heat conditions, and the carbohydrates such as a small molecular saccharide are important components of glycometabolism to produce a carbon source for microbes such as mildew and decay fungus. When the cement particle board is used for external wall decoration and is used as an outdoor furniture material, the wood or non-wood shaving (particle) in the cement particle board is subject to a long-term influence of irregular heat and water, and will thus breed bacteria such as mildew and decay fungus, thereby mildewing and rotting, and eventually leading to the mildew and rot of the cement particle board to cause its strength reduced and usability affected.

SUMMARY OF THE INVENTION

In view of this, an objective of the present invention is to provide a mildewproof and antirot high-strength cement particle board and a preparation method thereof. The preparation method provided by the present invention can avoid mildew and rot of a shaving in a cement particle board, and can significantly improve the mechanical strength and durability of the cement particle board.

To achieve the above purpose, the present invention provides the following technical solutions.

The present invention provides a preparation method of a mildewproof and antirot high-strength cement particle board, including the following steps:

(1) sequentially carbonizing and water-washing a shaving, and mixing the obtained carbonized shaving with a cement gelling agent, a curing agent aqueous solution and water to obtain a mixture;

(2) molding the mixture to obtain a pre-molded material; and (3) sequentially curing and drying the pre-molded material to obtain the mildewproof and antirot high-strength cement particle board.

Preferably, in the step (1), the shaving includes a wood shaving and/or a non-wood shaving; the shaving has a length of 10-30 mm, a width of 1-6 mm, a thickness of 0.2-0.4 mm, and a moisture content of 10%-12%.

Preferably, in the step (1), the carbonization treatment is a superheated steam carbonization treatment, and the pressure of superheated steam is 0.2-0.5 MPa.

Preferably, in the step (1), the carbonization treatment includes a first stage and a second stage in sequence; the temperature of the first stage is 100-109° C., and the time is 0.5-1 h; the temperature of the second stage is 150-190° C., and the time is 2-4 h.

Preferably, in the step (1), the cement gelling agent is Portland cement and/or magnesium oxychloride cement; a curing agent in the curing agent aqueous solution has a mass concentration of 10%, and the curing agent is $CaCl_2$.

Preferably, in the step (1), the mixing ratio is as follows: the carbonized shaving accounts for 23-32 parts by mass based on an absolute dry weight, the cement gelling agent accounts for 65-70 parts by mass, the curing agent aqueous solution accounts for 1-1.5 parts by mass, and the water accounts for 30-35 parts by mass.

Preferably, in the step (2), the molding treatment includes laying and cold-pressing in sequence; the thickness of the laying is 40-160 mm; the pressure of the cold-pressing is 3-5 MPa.

Preferably, in the step (3), the curing includes pressure curing and natural curing in sequence; the pressure of the pressure curing is 3-5 MPa, the temperature is 50-70° C., and the time is 8 h; the time of the natural curing is 10-15 d; the temperature of the drying in the step (3) is 80-90° C.; the moisture content of the mildewproof and antirot high-strength cement particle board is 9%-10%.

Preferably, after drying in the step (3), the preparation method further includes performing an edge-aligning and sanding treatment on the obtained dried board.

The present invention further provides a mildewproof and antirot high-strength cement particle board, prepared by the above preparation method.

The present invention further provides a preparation method of a mildewproof and antirot high-strength cement particle board, including the following steps: (1) sequentially carbonizing and water-washing a shaving, and mixing the obtained carbonized shaving with a cement gelling agent, a curing agent aqueous solution and water to obtain a mixture; (2) molding the mixture to obtain a pre-molded material; and (3) sequentially curing and drying the pre-molded material to obtain the mildewproof and antirot high-strength cement particle board. The present invention carbonizes the shaving to degrade hemicellulose and a small molecular saccharide compound in the shaving during the carbonization treatment, thereby preventing the hemicellulose in the shaving of the cement particle board in use from hydrolyzing into carbohydrates such as a small molecular saccharide under certain water and heat conditions; therefore, microbes such as mildew and decay fungus lose a material basis for growing in the cement particle board, thereby avoiding mildew and rot of the shaving in the cement particle board, and significantly extending the service life of the cement particle board. Moreover, after the shaving is carbonized and water-washed, the small molecular saccharide compound and that produced by the degradation of the hemicellulose are dissolved, leaving a large number of micropores in the shaving; when the cement particle board is molded, the cement gelling agent will enter the micropores and form a "glue nail" inside the board to improve the mechanical strength of the cement particle board. Therefore, the cement particle board prepared by the method of the present invention has mildew and rot resistance, and has a high mechanical strength. Results of embodiments show that, compared with an ordinary cement particle board which is not subjected to the carbonization treatment and water-washing, the cement particle board prepared by the method of the present invention can effectively avoid mildew and rot, and can significantly improve the mechanical strength and durability thereof, which helps to extend the service life of the cement particle board.

DETAILED DESCRIPTION

The present invention provides a preparation method of a mildewproof and antirot high-strength cement particle board, including the following steps:

(1) sequentially carbonize and water-wash a shaving, and mix the obtained carbonized shaving with a cement gelling agent, a curing agent aqueous solution and water to obtain a mixture;

(2) mold the mixture to obtain a pre-molded material; and (3) sequentially cure and dry the pre-molded material to obtain the mildewproof and antirot high-strength cement particle board.

The present invention sequentially carbonizes and water-washes the shaving, and mixes the obtained carbonized shaving with the cement gelling agent, the curing agent aqueous solution and the water to obtain the mixture. In the present invention, the shaving preferably includes a wood shaving and/or a non-wood shaving; the shaving has a length of preferably 10-30 mm, more preferably 15-25 mm, and a width of preferably 1-6 mm, more preferably 2-5 mm, and a thickness of preferably 0.2-0.4 mm, more preferably 0.3 mm. In the present invention, the shaving is preferably machined from a wood or non-wood material, specifically, wood, bamboo or agricultural straw such as cotton straw. The present invention has no particular requirement on the method of machining, and a machining method well known in the art can be used to ensure that the length, width and thickness of the obtained shaving are satisfactory. In the present invention, the shaving has a moisture content of preferably 10%-12%. In a specific embodiment of the present invention, if the moisture content of the shaving does not meet the requirement, the shaving is preferably dried to have a moisture content of 10%-12% before the carbonization treatment. The present invention has no particular requirement on the method of drying, and a method well known in the art can be used to dry the shaving to the satisfactory water content.

In the present invention, the carbonization treatment is preferably a superheated steam carbonization treatment; the superheated steam carbonization treatment is preferably performed in a carbonization tank filled with superheated steam. The present invention has no particular requirement on the carbonization tank, and a carbonization tank well known in the art can be used. In the present invention, the pressure of the superheated steam is preferably 0.2-0.5 MPa, and more preferably 0.3-0.4 MPa. In the present invention, the carbonization treatment includes a first stage and a second stage in sequence; the temperature of the first stage is preferably 100-109° C., more preferably 105° C., and the time is preferably 0.5-1 h, and more preferably 0.8 h; the temperature of the second stage is preferably 150-190° C., more preferably 160-180° C., and the time is preferably 2-4 h, and more preferably 3 h. In the present invention, the first stage is a drying stage of the carbonization treatment, and the second stage is a carbonization stage of the carbonization treatment; after the first stage is completed, the temperature of the carbonization tank is raised to the range of the temperature of the second stage to perform the second stage of treatment. The present invention carbonizes the shaving to degrade hemicellulose and a small molecular saccharide compound in the shaving during the carbonization treatment, thereby preventing the hemicellulose in the shaving of the cement particle board in use from hydrolyzing into carbohydrates such as a small molecular saccharide under certain water and heat conditions; therefore, microbes such as mildew and decay fungus lose a material basis for growing in the cement particle board, thereby avoiding mildew and rot of the shaving in the cement particle board, and significantly extending the service life of the cement particle board. After the carbonization treatment, the present invention preferably cools the carbonized shaving. The present invention has no particular requirement on the method of cooling, and a method well known in the art can be used to cool the carbonized shaving to a room temperature.

In the present invention, the water-washing is preferably performed in a stirring tank, which preferably has functions of stirring and rotating, and the specific operation is: the carbonized shaving is fed into the stirring tank, the stirring function of the stirring tank is started to stir and water-wash the carbonized shaving, and then the rotating function of the stirring tank is started to remove visible water from the shaving by a rotating centrifugal force. In the present invention, the time of the stirring and water-washing is preferably 10-20 min. The present invention has no particular requirement on the time of the rotating, so long as the visible water (i.e. water that is visible) can be sufficiently removed. After the water-washing, the small molecular saccharide compound in the shaving and that produced by the degradation of the hemicellulose are dissolved.

After obtaining the carbonized shaving, the present invention mixes the obtained carbonized shaving with the cement gelling agent, the curing agent aqueous solution and the water. In the present invention, the cement gelling agent is preferably Portland cement and/or magnesium oxychloride cement. The present invention has no particular requirement on the source of the Portland cement and the magnesium oxychloride cement, and those well known in the art can be used. In the present invention, a curing agent in the curing agent aqueous solution has a mass concentration of preferably 10%, and the curing agent is preferably $CaCl_2$. The present invention has no particular requirement on the water, and water well known in the art can be used, specifically, tap water. In the present invention, the mixing ratio is preferably: the carbonized shaving accounts for 23-32 parts by mass based on an absolute dry weight, the cement gelling agent accounts for 65-70 parts by mass, the curing agent aqueous solution accounts for 1-1.5 parts by mass, and the water accounts for 30-35 parts by mass; more preferably, the carbonized shaving accounts for 25-30 parts by mass based on an absolute dry weight, the cement gelling agent accounts for 66-68 parts by mass, the curing agent aqueous solution accounts for 1.2-1.4 parts by mass, and the water accounts for 32-34 parts by mass. The present invention preferably mixes under a stirring condition, specifically, the carbonized shaving, the cement gelling agent, the curing agent aqueous solution and the water are fed to a stirrer for stirring and mixing. The present invention has no particular requirement on the time and rotation speed of the stirring, so long as the components can be uniformly mixed.

After obtaining the mixture, the present invention molds the mixture to obtain the pre-molded material. In the present invention, the molding treatment includes laying and cold-pressing in sequence. In the present invention, the thickness of the laying is preferably 40-160 mm, and more preferably 60-130 mm; and after the laying is completed, the mixture forms a cement particle board slab. In the present invention, the laying is preferably performed by a mechanical laying machine, specifically: the mixture is fed to the mechanical laying machine to form a cement particle board slab of the above thickness on a backing plate. The present invention has no particular requirement on the mechanical laying machine, and a mechanical laying machine well known in the art can be used. In the present invention, the pressure of the cold-pressing is preferably 3-5 MPa, and more preferably 4 MPa. In the present invention, the cold-pressing is preferably performed in a cold press, and the cement particle board slab is preferably stacked on a mold clamping frame and then fed to the cold press; the specific operation is as follows: the cement particle board slab together with the backing plate is stacked on a lower mold clamping frame to form a board stack, and the board stack is covered by an upper mold clamping frame and fed to the cold press to pressurize the clamped mold; the number of stacked cement particle boards is preferably 40-80. The present invention has no particular requirement on the cold press and the mold clamping frame, and corresponding apparatuses well known in the art can be used. In the present invention, after the shaving is carbonized and water-washed, the small molecular saccharide compound and that produced by the degradation of the hemicellulose are dissolved, leaving a large number of micropores in the shaving; when the cement particle board is cold-pressed and molded, the cement gelling agent will enter the micropores and form a "glue nail" inside the board to improve the mechanical strength of the cement particle board.

After obtaining the pre-molded material, the present invention sequentially cures and dries the pre-molded material to obtain the mildewproof and antirot high-strength cement particle board. In the present invention, the curing preferably includes pressure curing and natural curing in sequence. In the present invention, the pressure of the pressure curing is preferably 3-5 MPa, more preferably 4 MPa, the temperature is 50-70° C., more preferably 60° C., and the time is preferably 8 h. In the present invention, the pressure curing is preferably performed in a curing room, that is, after the cold-pressing, the mold clamping frame is fed to the curing room for pressure curing. In the present invention, the time of the natural curing is preferably 10-15 d, more preferably 12-13 d; preferably, the mold clamping frame is opened, and the pre-molded material is separated from the backing plate, and is stacked for the natural curing. In the present invention, the temperature of the drying is preferably 80-90° C., more preferably 85° C.; the moisture content of the mildewproof and antirot high-strength cement particle board obtained after the drying is preferably 9%-10%, which means that the time of the drying is appropriate when the moisture content of the obtained board is reduced to the required range. In the present invention, the drying is preferably performed in a drying kiln.

After the drying, the present invention further performs an edge-aligning and sanding treatment on the dried board. The present invention has no particular requirement on the method of the edge-aligning and sanding treatment, and a method well known in the art can be used. Specifically, the dried board is fed to a vertical and horizontal edger for edge aligning, and then fed to a wide belt sander for surface sanding, to finally obtain the mildewproof and antirot high-strength cement particle board after the edge-aligning and sanding treatment.

The present invention further provides a mildewproof and antirot high-strength cement particle board prepared by the preparation method in the above solution. The cement particle board provided by the present invention has mildew and rot resistance, and has a high mechanical strength. The mildewproof and antirot high-strength cement particle board provided by the present invention can have a static bending strength of 13.8-17.3 MPa, an elastic modulus of 3,500-4,220 MPa, an internal bond strength of 0.70-1.1 MPa, a 24 h absorption thickness swelling rate of 0.6%-1.1%, and a surface infection area of 0 after 4 weeks of mildew and rot resistance tests. Compared with an ordinary cement particle board, the mildew and rot resistance and mechanical strength of the cement particle board provided by the present invention are significantly improved.

The following describes the mildewproof and antirot high-strength cement particle board and the preparation method thereof in detail below with reference to embodiments, but the embodiments may not be construed as a limitation to the claimed scope of the present invention.

Embodiment 1

(1) Poplar wood is machined into a poplar shaving having a length of 20 mm, a width of 2 mm, and a thickness of 0.2 mm.

(2) The poplar shaving is dried to a moisture content of 12%, fed to a carbonization tank filled with superheated steam, and treated first at a temperature of 105° C. for 0.8 h, and then at a raised temperature of 170° C. for 3 h in the carbonization tank, where the pressure of the superheated steam in the carbonization tank is set to 0.4 MPa.

(3) The carbonized poplar shaving is cooled to a room temperature, and fed to a stirring tank having functions of stirring and rotating; the stirring function is started to stir and wash with tap water for 20 min, and then the rotating function is started to remove visible water from the poplar shaving by a rotating centrifugal force.

(4) A curing agent $CaCl_2$ is formulated into an aqueous solution having a concentration of 10%.

(5) The water-washed carbonized poplar shaving and ordinary Portland cement 325, tap water and the curing agent solution are fed to a stirrer to be uniformly stirred, where the poplar shaving (absolute dry weight) accounts for 23 parts by mass, the ordinary Portland cement accounts for 70 parts by mass, the tap water accounts for 35 parts by mass, and the curing agent solution accounts for 1.0 part by mass.

(6) The uniformly stirred mixture is fed to a mechanical laying machine to form a 160 mm thick cement particle board slab on a backing plate; 40 board slabs together with the backing plate are stacked on a lower mold clamping frame to form a board stack, and the board slack is covered by an upper mold clamping frame and fed to a cold press to pressurize the clamped mold, where the cold press provides a pressure of 4 MPa.

(7) The mold clamping frame is fed to a curing room for pressure curing at a temperature of 60° C. for 8 h; then the mold clamping frame is opened to separate a semi-finished product of the cement particle board from the backing plate, and the cement particle board is stacked for natural curing for 15 d.

(8) The naturally dried cement particle board is fed to a drying kiln and dried at a temperature of 85° C. to a moisture content of about 10%.

(9) The dried board is fed to a vertical and horizontal edger for vertical and horizontal trimming, and then fed to a wide belt sander for surface sanding, to finally obtain a finished poplar cement particle board.

COMPARATIVE EXAMPLE 1

Steps (2) and (3) of Embodiment 1 are omitted, that is, the poplar shaving is not subjected to the carbonized treatment water-washing, and the rest is the same as those of Embodiment 1; a finally obtained poplar cement particle board is an ordinary cement particle board.

The poplar cement particle boards obtained in Embodiment 1 and Comparative Example 1 are subjected to a mildew resistance test and a rot resistance test (the rot resistance test refers to the rot resistance standard of wood GB/T13942.1-2009, and the mildew resistance test refers to the mildew resistance standard of wood GB/T18261-2013). Results: After 4 weeks of the mildew and rot resistance tests, a surface infection area of a poplar cement particle board sample of Comparative Example 1 is greater than ½, while the surface infection area of the poplar cement particle board sample of Embodiment 1 is 0.

The poplar cement particle boards obtained in Embodiment 1 and Comparative Example 1 are subjected to a mechanical strength test and a natural aging test which is in accordance with the international standard ISO 16053-2010, and the results are respectively shown in Table 1 and Table 2:

TABLE 1

Comparison of mechanical strength of poplar cement particle boards of Embodiment 1 and Comparative Example 1

| | Static bending strength (MPa) | Elastic modulus (MPa) | Internal bond strength (MPa) | 24 h absorption thickness swelling rate (%) |
|---|---|---|---|---|
| Comparative Example 1 | 11.2 | 3100 | 0.55 | 1.6 |
| Embodiment 1 | 15.6 | 3985 | 0.74 | 1.0 |

TABLE 2

Comparison of natural aging test results of poplar cement particle boards of Embodiment 1 and Comparative Example 1

| | Thickness swelling rate (%) | | | Static bending strength reduction rate (%) | | | Internal bond strength reduction rate (%) | | |
|---|---|---|---|---|---|---|---|---|---|
| | 1 year | 2 years | 3 years | 1 year | 2 years | 3 years | 1 year | 2 years | 3 years |
| Comparative Example 1 | 0.65 | 1.30 | 1.72 | 3.5 | 4.1 | 7.84 | 1.0 | 1.36 | 2.4 |
| Embodiment 1 | 0.21 | 0.32 | 0.59 | 0.40 | 0.47 | 0.60 | 0.1 | 0.32 | 0.39 |

Embodiment 2

(1) A bamboo is machined into a bamboo shaving having a length of 25 mm, a width of 1.5 mm, and a thickness of 0.2 mm.

(2) The bamboo shaving is dried to a moisture content of 12%, fed to a carbonization tank filled with superheated steam, and treated first at a temperature of 109° C. for 1 h, and then at a raised temperature of 190° C. for 4 h in the carbonization tank, where the pressure of the superheated steam in the carbonization tank is set to 0.5 MPa.

(3) The carbonized bamboo shaving is cooled to a room temperature, and fed to a stirring tank having functions of stirring and rotating; the stirring function is started to stir and wash with tap water for 20 min, and then the rotating function is started to remove visible water from the bamboo shaving by a rotating centrifugal force.

(4) A curing agent $CaCl_2$ is formulated into an aqueous solution having a concentration of 10%.

(5) The water-washed carbonized bamboo shaving and ordinary Portland cement 425, tap water and the curing agent solution are fed bamboo to a stirrer to be uniformly stirred, where the bamboo shaving (absolute dry weight) accounts for 25 parts by mass, the ordinary Portland cement accounts for 68 parts by mass, the tap water accounts for 34 parts by mass, and the curing agent solution accounts for 1.5 part by mass.

(6) The uniformly stirred mixture is fed to a mechanical laying machine to form a 120 mm thick cement particle board slab on a backing plate; 60 particle board slabs together with the backing plate are stacked on a lower mold clamping frame to form a board stack, and the board slack is covered by an upper mold clamping frame and fed to a cold press to pressurize the clamped mold, where the cold press provides a pressure of 3.5 MPa.

(7) The mold clamping frame is fed to a curing room for pressure curing at a temperature of 70° C. for 8 h; then the mold clamping frame is opened to separate a semi-finished product of the cement particle board from the backing plate, and the cement particle board is stacked for natural curing for 12 d.

(8) The naturally dried cement particle board is fed to a drying kiln and dried at a temperature of 90° C. to a moisture content of about 10%.

(9) The dried board is fed to a vertical and horizontal edger for vertical and horizontal trimming, and then fed to a wide belt sander for surface sanding, to finally obtain a finished bamboo cement particle board.

COMPARATIVE EXAMPLE 2

Steps (2) and (3) of Embodiment 2 are omitted, that is, the bamboo shaving is not subjected to the carbonized treatment water-washing, and the rest is the same as those of Embodiment 1; a finally obtained bamboo cement particle board is an ordinary cement particle board.

The bamboo cement particle boards obtained in Embodiment 2 and Comparative Example 2 are subjected to a mildew resistance test and a rot resistance test. Results: After 4 weeks of the mildew and rot resistance tests, a surface infection area of a bamboo cement particle board sample of Comparative Example 2 is greater than ½, while the surface infection area of the bamboo cement particle board sample of Embodiment 2 is 0.

The bamboo cement particle boards obtained in Embodiment 2 and Comparative Example 2 are subjected to a mechanical strength test and a natural aging test, and the results are respectively shown in Table 3 and Table 4:

TABLE 3

Comparison of mechanical strength of bamboo cement particle boards of Embodiment 2 and Comparative Example 2

|  | Static bending strength (MPa) | Elastic modulus (MPa) | Internal bond strength (MPa) | 24 h absorption thickness swelling rate (%) |
|---|---|---|---|---|
| Comparative Example 2 | 15.1 | 3700 | 0.72 | 1.5 |
| Embodiment 2 | 17.3 | 4220 | 1.1 | 0.6 |

TABLE 4

Comparison of natural aging test results of bamboo cement particle boards of Embodiment 2 and Comparative Example 2

|  | Thickness swelling rate (%) | | | Static bending strength reduction rate (%) | | | Internal bond strength reduction rate (%) | | |
|---|---|---|---|---|---|---|---|---|---|
|  | 1 year | 2 years | 3 years | 1 year | 2 years | 3 years | 1 year | 2 years | 3 years |
| Comparative Example 2 | 0.51 | 1.15 | 1.40 | 2.3 | 3.3 | 5.7 | 0.91 | 1.15 | 2.0 |
| Embodiment 2 | 0.18 | 0.22 | 0.48 | 0.32 | 0.45 | 0.50 | 0.07 | 0.24 | 0.30 |

Embodiment 3

(1) Cotton straw is machined into a cotton straw shaving having a length of 20 mm, a width of 1.0 mm, and a thickness of 0.3 mm.

(2) The cotton straw shaving is dried to a moisture content of 12%, fed to a carbonization tank filled with superheated steam, and treated first at a temperature of 100° C. for 1 h, and then at a raised temperature of 150° C. for 3 h in the carbonization tank, where the pressure of the superheated steam in the carbonization tank is set to 0.4 MPa.

(3) The carbonized cotton straw shaving is cooled to a room temperature, and fed to a stirring tank having functions of stirring and rotating; the stirring function is started to stir and wash with tap water for 20 min, and then the rotating function is started to remove visible water from the cotton straw shaving by a rotating centrifugal force.

(4) A curing agent $CaCl_2$ is formulated into an aqueous solution having a concentration of 10%.

(5) The water-washed carbonized cotton straw shaving and ordinary Portland cement 325, tap water and the curing agent are fed to a stirrer to be uniformly stirred, where the cotton straw shaving (absolute dry weight) accounts for 28 parts by mass, the ordinary Portland cement accounts for 70 parts by mass, the tap water accounts for 33 parts by mass, and the curing agent solution accounts for 1.3 part by mass.

(6) The uniformly stirred mixture is fed to a mechanical laying machine to form a 120 mm thick cement particle board slab on a backing plate; 60 board slabs together with the backing plate are stacked on a lower mold clamping frame to form a board stack, and the board slack is covered by an upper mold clamping frame and fed to a cold press to pressurize the clamped mold, where the cold press provides a pressure of 3.0 MPa.

(7) The mold clamping frame is fed to a curing room for pressure curing at a temperature of 70° C. for 8 h; then the mold clamping frame is opened to separate a semi-finished product of the cement particle board from the backing plate, and the cement particle board is stacked for natural curing for 15 d.

(8) The naturally dried cement particle board is fed to a drying kiln and dried at a temperature of 80° C. to a moisture content of about 10%.

(9) The dried board is fed to a vertical and horizontal edger for vertical and horizontal trimming, and then fed to a wide belt sander for surface sanding, to finally obtain a finished cotton straw cement particle board.

COMPARATIVE EXAMPLE 3

Steps (2) and (3) of Embodiment 3 are omitted, that is, the cotton straw shaving is not subjected to the carbonized treatment water-washing, and the rest is the same as those of Embodiment 1; a finally obtained cotton straw cement particle board is an ordinary cement particle board.

The cotton straw cement particle boards obtained in Embodiment 3 and Comparative Example 3 are subjected to a mildew resistance test and a rot resistance test. Results: After 4 weeks of the mildew and rot resistance tests, a surface infection area of a cotton straw cement particle board sample of Comparative Example 3 is greater than ½, while the surface infection area of the cotton straw cement particle board sample of Embodiment 3 is 0.

The cotton straw cement particle boards obtained in Embodiment 3 and Comparative Example 3 are subjected to a mechanical strength test an a natural aging test, and the results are respectively shown in Table 5 and Table 6:

TABLE 5

Comparison of mechanical strength of cotton straw cement particle boards of Embodiment 3 and Comparative Example 3

|  | Static bending strength (MPa) | Elastic modulus (MPa) | Internal bond strength (MPa) | 24 h absorption thickness swelling rate (%) |
|---|---|---|---|---|
| Comparative Example 3 | 10.7 | 2980 | 0.51 | 1.8 |
| Embodiment 3 | 13.8 | 3500 | 0.70 | 1.1 |

TABLE 6

Comparison of natural aging test results of cotton straw cement particle boards of Embodiment 3 and Comparative Example 3

|  | Thickness swelling rate (%) | | | Static bending strength reduction rate (%) | | | Internal bond strength reduction rate (%) | | |
|---|---|---|---|---|---|---|---|---|---|
|  | 1 year | 2 years | 3 years | 1 year | 2 years | 3 years | 1 year | 2 years | 3 years |
| Comparative Example 3 | 0.74 | 1.51 | 1.9 | 4.0 | 5.2 | 8.32 | 1.16 | 1.42 | 2.8 |
| Embodiment 3 | 0.28 | 0.44 | 0.63 | 0.46 | 0.55 | 0.67 | 0.14 | 0.39 | 0.42 |

It can be seed from the above embodiment that, compared with the ordinary cement particle boards which are not subjected to the carbonization treatment and water-washing, the cement particle boards prepared by Embodiments 1-3 can effectively avoid mildew and rot, and can significantly improve the mechanical strength and durability thereof, which helps to extend the service life of the cement particle boards.

The foregoing descriptions are only preferred implementation manners of the present invention. It should be noted that for a person of ordinary skill in the art, several improvements and modifications may further be made without departing from the principle of the present invention. These improvements and modifications should also be deemed as falling within the protection scope of the present invention.

What is claimed is:

1. A preparation method of a mildewproof and antirot high-strength cement particle board, comprising:
   sequentially carbonizing and water-washing a shaving, and mixing the obtained carbonized shaving with a cement gelling agent, a curing agent aqueous solution and water to obtain a mixture;
   molding the mixture to obtain a pre-molded material; and
   sequentially curing and drying the pre-molded material to obtain the mildewproof and antirot high-strength cement particle board.

2. The preparation method according to claim 1, wherein the shaving comprises at least one of a wood shaving and a non-wood shaving, the shaving having a length of 10-30 mm, a width of 1-6 mm, a thickness of 0.2-0.4 mm, and a moisture content of 10%-12%.

3. The preparation method according to claim 1, wherein the carbonizing is a superheated steam carbonization treatment, where a pressure of superheated steam is in a range of 0.2-0.5 MPa.

4. The preparation method according to claim 1, wherein the carbonizing comprises a first stage and a second stage in sequence, the first stage is conducted at a temperature of 100-109° C., for 0.5-1 h; and the second stage is conducted at a temperature of 150-190° C., for 2-4 h.

5. The preparation method according to claim 3, wherein the carbonizing comprises a first stage and a second stage in sequence, the first stage is conducted at a temperature of 100-109° C., for 0.5-1 h; and the second stage is conducted at a temperature of 150-190° C., for 2-4 h.

6. The preparation method according to claim 1, wherein the cement gelling agent comprises at least one of a Portland cement and a magnesium oxychloride cement; and a curing age t in the curing agent aqueous solution is $CaCl_2$ having a mass concentration of 10%.

7. The preparation method according to claim 1, wherein a mixing ratio for the mixing of the obtained carbonized shaving with the cement gelling agent, the curing agent aqueous solution and water comprises: the carbonized shaving accounts for 23-32 parts by mass based on an absolute dry weight, the cement gelling agent accounts for 65-70 parts by mass, the curing agent aqueous solution accounts for 1-1.5 parts by mass, and the water accounts for 30-35 parts by mass.

8. The preparation method according to claim 6, wherein a mixing ratio for the mixing of the obtained carbonized with the cement gelling agent, the curing agent aqueous solution and water comprises: the carbonized shaving accounts for 23-32 parts by mass based on an absolute dry weight, the cement gelling agent accounts for 65-70 parts by mass, the curing agent aqueous solution accounts for 1-1.5 parts by mass, and the water accounts for 30-35 parts by mass.

9. The preparation method according to claim 1, wherein the molding comprises laying and cold-pressing in sequence, a thickness of the laying is in a range of 40-160 mm, and a pressure of the cold-pressing is in a range of 3-5 MPa.

10. The preparation method according to claim 1, wherein the curing comprises pressure curing and natural curing in sequence, the pressure curing is conducted at a pressure of 3-5 MPa, and a temperature of 50-70° C., for 8 h; the natural curing is conducted for 10-15 days; the drying is conducted at a temperature of 80-90° C.; and a moisture content of the mildewproof and antirot high-strength cement particle board is 9%-10%.

11. The preparation method according to claim 1, further comprising, after the drying performing an edge-aligning and sanding treatment on the obtained dried cement particle board.

* * * * *

UNITED STATES PATENT AND TRADEMARK OFFICE
CERTIFICATE OF CORRECTION

| | |
|---|---|
| PATENT NO. | : 11,702,362 B2 |
| APPLICATION NO. | : 16/571578 |
| DATED | : July 18, 2023 |
| INVENTOR(S) | : Yiqiang Wu et al. |

It is certified that error appears in the above-identified patent and that said Letters Patent is hereby corrected as shown below:

In the Claims

Column 12, Line 32/33, in Claim 6 should be:
- agent instead of age t -

Column 12, Line 43/44, in Claim 8 should be:
- the word shaving is missing after the word carbonized as showed in the Amendment filed March 2, 2023 -

Signed and Sealed this
Third Day of December, 2024

Katherine Kelly Vidal
*Director of the United States Patent and Trademark Office*